United States Patent [19]

Nikawitz et al.

[11] 3,852,219

[45] Dec. 3, 1974

[54] ODORANT COMPOSITIONS INCLUDING 2-BUTYL-1-ALKYNYLCYCLOALKAN-1-OLS AND DERIVATIVES THEREOF

[75] Inventors: Edward J. Nikawitz, Glen Rock; Robert F. Tavares, Cedar Grove; William M. Easter, Jr., Hasbrouck Heights, all of N.J.

[73] Assignee: Givaudan Corporation, Clifton, N.J.

[22] Filed: May 25, 1973

[21] Appl. No.: 363,933

Related U.S. Application Data

[62] Division of Ser. No. 88,494, Nov. 10, 1970, Pat. No. 3,769,330.

[52] U.S. Cl. .............................................. 252/522
[51] Int. Cl. ............................................. C11b 9/00
[58] Field of Search .................................... 252/522

[56] References Cited
UNITED STATES PATENTS

| | | | |
|---|---|---|---|
| 2,125,384 | 8/1938 | Macallum | 260/638 |
| 3,153,097 | 10/1964 | Cameron | 260/638 |
| 3,225,110 | 12/1965 | Kurtz | 260/638 |

OTHER PUBLICATIONS

Wagner–Zook, Syn. Org. Chem. 1965 pp. 161–163.

Chem. Abs., Vol. 61, 1964, p. 6929e.

Primary Examiner—Albert T. Meyers
Assistant Examiner—Anna P. Fagelson
Attorney, Agent, or Firm—Thomas Cifelli, Jr.

[57] ABSTRACT

2-Butyl-1-alkynylcycloalkan-1-ols and their alkanoyl and hydrogenated derivatives, especially the cyclopentanol, cyclohexanol and cycloheptanol members of this group possess a strong, woody odor of the ambergris type. Their odorant qualities are especially valuable in perfumery. The positional isomers and homologous compounds with a different number of carbon atoms in the alkyl side chain do not possess this quality.

4 Claims, No Drawings

ODORANT COMPOSITIONS INCLUDING 2-BUTYL-1-ALKYNYLCYCLOALKAN-1-OLS AND DERIVATIVES THEREOF

This is a division of application Ser. No. 88,494, filed Nov. 10, 1970, now U.S. Pat. No. 3,769,330, issued Oct. 30, 1973.

DESCRIPTION OF THE PRIOR ART

Compounds within the scope of the present invention, are broadly disclosed as corrosion inhibitors in U.S. Pat. No. 2,993,864. There is no reference therein to any odorant properties of these compounds. Only one butyl derivative, namely 4-tert-butyl-1-ethynylcyclohexan-1-ol is disclosed. However tests described hereinbelow show that this compound, as well as its acetyl derivative have very weak odors and are totally valueless as odorants.

FIELD OF THE INVENTION

Novel carbocyclic odorants.

SUMMARY OF THE INVENTION

The compounds of the present invention possess the following general structure:

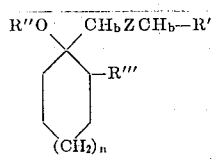

where
R' is hydrogen or methyl.
R'' is hydrogen or lower alkanoyl
R''' is butyl
n is 0, 1 or 2; Z is a single, double, or triple bond, and b is correspondingly 2, 1, or 0.

The compounds of the present invention are prepared from the corresponding 2-butyl cycloalkanone by alkynylation followed, where desired by esterification and catalytic hydrogenation as shown in Chart I below.

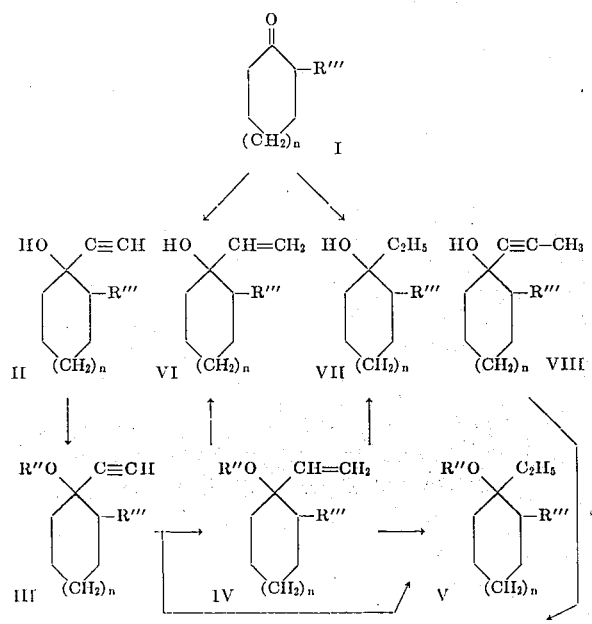

CHART I

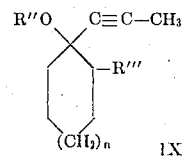

wherein
n = 0, 1 or 2
R''' = (a) n-butyl, (b) sec-butyl, (c) tert-butyl (d) iso-butyl.
R'' = lower alkanoyl, suitably formyl, acetyl, or propionyl.

In this process where the ethynyl derivatives are desired the ketone (I) is reacted with acetylene suitably in the form of an alkali metal acetylide to yield the 2-butyl-1-ethynyl-cycloalkan-1-ol (II). Where the propynyl derivative is desired methylacetylene is reacted with ketone (I), suitably in the form of the alkynyl-Grignard reagent to yield the corresponding compound (VIII). If desired the compound (II) is esterified in the usual manner. To form the saturated and partially saturated derivatives compound (III) is hydrogenated either with Lindlar catalyst to form the vinyl derivative (IV) or with Raney nickel to give the fully saturated alkyl derivative (V). Saponification of (IV) or (V) yields the appropriate alcohol (VI) or (VII). Compounds (VI) and (VII) may also be obtained directly by reaction of the ketone (I) with the appropriate vinyl or alkyl Grignard.

The compounds of the present invention find use as odorants and may be used in perfumes, soaps and other toilet goods. The formulations may contain between 0.1 and 20 percent of the odorant material. For example, colognes would contain between 1 and 5 percent of the odorant.

However, beyond the general utility as extremely valuable perfume ingredients on account of their strong and diffusive earthy, woody, mossy, cedar, vetiver notes it is of the utmost significance that some of these compounds possess odors with a marked likeness or relationship to that of Ambergris.

It is extremely surprising and unexpected that these compounds of a relatively simple structure are endowed with this outstanding odor quality considering the rather complex chemical configurations which are associated with this important and rare type of fragrance.

Even more surprising and unexpected is the fact that compounds with a closely related chemical structure are of little or no value for perfumery on account of uninteresting, trivial, weak, even repulsive notes or because they have no odor at all.

This surprising and unexpected selectivity goes so far that the 3- and 4-position isomers of these butyl derivatives not only lack the Ambergris odoriferous note but also any of the powerful valuable odor qualities inherent to the compounds of this invention.

DESCRIPTION OF THE PREFERRED EMBODIMENTS

In the preferred embodiments of the invention, the reaction of the parent ketone with acetylene can be carried out using an suitable ethynylation procedure. For example, the ketones can be brought to reaction with the appropriate Lithium acetylide-ethylenediamine complex, with an alkali metal acetylide in a suitable solvent, such as liquid ammonia, dimethylformamide, ether or the like at a temperature of about 0° to −50°C or with acetylene and finely divided potassium hydroxide in methylal or similar solvents.

The specific procedures utilized are well known in the ethynylation art, however, yields are optimized if certain specific procedures are followed.

To insure complete reaction of the metal acetylide with the ketones the reactants are used on an, at least, equimolecular basis; however, it is preferred to apply some excess of the acetylide and also to have an excess of acetylene present during the reaction.

The ketones are usually added undiluted or dissolved in a solvent as for instance toluene or ether.

The time for addition of the ketones can vary considerably; i.e., a range of about 0.5 to about 10 hours is appropriate; usually followed by an additional agitation period of from about 15 minutes to about 3 hours. The ammonia is allowed to evaporate, suitably by standing under ambient temperatures for up to 20 hours. Water, ammonium chloride solution or dilute sulfuric acid is added and the ethynyl reaction products are separated from the aqueous phase by conventional means.

For the preparation of the propynyl alcohols reaction with the Grignard compound of methylacetylene is preferred, i.e., with $CH_3-C \equiv C-MgCl$ or $CH_3-C \equiv C-MgBr$.

According to conventional methods a Grignard solution is prepared from magnesium and bromoethane in a suitable solvent, such as tetrahydrofuran. Mathylacetylene is introduced over a period of about 1 to 3 hours at a temperature range of about 20°–40°.

The pertinent ketone, as such, or in a suitable solution such as tetrahydrofuran, is added during from about 15 minutes to about 3 hours followed by an additional reaction period of about 5 to 25 hours at a temperature range of about 20°–40°. After addition of ammonium chloride solution the propynyl alcohols are extracted with a suitable water immiscible solvent and purified in the usual manner, suitably by distillation.

Stoichiometric quantities of the pertinent reactants (Grignard, ketone) are usually utilized although an excess of about up to 20 percent of either one does not impair the proper progress of the reaction.

The respective vinyl and alkyl alcohols may be prepared by conventional processes. The reaction of the ketones with the appropriate Grignard reagents, is preferred. The choice of solvents, temperature ranges, stoichiometric amounts and their variations etc., would be apparent to those skilled in the art. As mentioned, saponfication of the pertinent esters leads also to the desired alcohols.

The parent ethynyl or propynyl alcohols are purified by distillation at reduced pressure (about 0.1–5 mm). They are water-white to very slightly yellowish liquids, insoluble in water but soluble in alcohols, ketones, ethers, esters and hydrocarbons. Their odor characteristic is described in the pertinent examples.

The corresponding vinyl and saturated alcohols are also purified by distillation as described above. Their appearance and solubility conform to that of their triply bonded congeners.

The esterification of the acetylenic alcohols is preferably carried out with the appropriate acid anhydrides. For instance, the formates can be prepared by reaction with formic/acetic anhydride at temperatures betwen 0–30° for a period of 2–5 days.

The esters higher than formic are obtained by esterification with the appropriate acid anhydride at a temperature range of about 0–50° for about 10–100 hours, employing catalytic amounts of phosphoric acid or any other suitable catalyst; or else the esterification can be carried out with acid anhydride at reflux (or from about 50°–140°) in the presence or absence of an alkali metal salt of the corresponding organic acid for about 2–30 hours.

The preferred reaction time in the foregoing reactions will vary within the times given and depends upon the nature of the reactants used. In either case, solvents like benzene, toluene, hexane or heptane may be used. Other esterification methods known to those skilled in the art can be used, for example, acid chlorides with pyridine or dimethylaniline. The esters are purified by distillation at reduced pressure; they are water-white to slightly yellowish colored liquids, insoluble in water but soluble in organic solvents as alcohols, ethers, ketones, esters, hydrocarbons and halohydrocarbons. Their specific odor characteristics are described in the pertinent examples.

The hydrogenated esters may be also obtained by reduction of the corresponding acetylenic compound. The vinyl compounds are prepared by catalytic hydrogenation under pressure in the presence of Lindlar catalyst in a suitable solvent. Suitably, the acetylenic compound is taken up in a solvent such as hexane or the like, a 1:1 mixture of unsaturated material and solvent being suitable and hydrogenating at between 30° and 60°C, suitably at 45°–50°C at a pressure of from about 30 to about 60 psi, preferably at 45–50 psi for from about 4 to 6 hours. Since the catalyst loses its catalytic ability after this time it has been found helpful to add fresh catalyst between 1 and 4 times until the calculated amount of hydrogen has been taken up. The solution containing the vinyl ester (IV) is then worked up in the usual manner.

The fully saturated derivative (V) is most readily obtained by reduction in the presence of Raney nickel in a hydroxylic solvent under pressure. Reduction in methanol in the presence of soda ash at between 15° and 35°C, suitably at about 25°C and 30 to 60 psi, suitably at about 50 psi gives desirable results. The product is isolated in the usual manner. The saturated product (V) can of course also be derived from the vinyl ester (IV) by hydrogenation with, say, platinum oxide or palladium on charcoal.

The reduced esters may be readily saponified to yield the corresponding alcohols (VI) and (VII).

It should be noted that both, the alcohols and esters of the present invention, exist as cis-trans stereoisomers, whose odor characteristics differ somewhat. The isomers may be separated by any known method for the resolution of hydroxyl-containing stereoisomers. It has been found that fractional distillation of the pertinent alcohols at reduced pressure leads to separation of the isomers which, in turn, can be converted to the respective stereoisomeric esters by means of previously described procedures. For the practical purpose of use in perfumery this separation is usually not necessary.

The compounds within the scope of the present invention include the compounds listed below. Certain of these compounds were subjected to detailed examination of their perfumery properties. For convenience these compounds are followed by a designatory letter.

This letter is a reference for the subsequent tabulations.
2-sec-Butyl-1-ethynylcyclohexanol, mixture of cis and trans (A)
2-sec-Butyl-1-ethynylcyclohexanol (cis) (D)
2-sec-Butyl-1-ethynylcyclohexanol (trans) (E) 2-sec-Butyl-1-ethynylcyclopentanol (cis/trans)
2-sec-Butyl-1-ethynylcycloheptanol (cis/trans)
2-iso-Butyl-1-ethynylcyclohexanol (cis/trans)
2-n-Butyl-1-ethynylcyclohexanol (cis/trans)
2-sec-Butyl-1-ethylcyclohexanol (cis/trans)
2-sec-Butyl-1-vinylcyclohexanol (cis/trans)
2-sec-Butyl-1-(1-propynyl)-cyclohexanol (cis/trans)
1-Acetoxy-2-sec-butyl-1-ethynylcyclohexane, mixture of cis and trans. (B)
1-Acetoxy-2-sec-butyl-1-ethynylcyclohexane (cis) (F)
1-Acetoxy-2-sec-butyl-1-ethynylcyclohexane (trans) (G)
2-sec-Butyl-1-ethynyl-1-formyloxycyclohexane (cis/trans) (H)
2-sec-Butyl-1-ethynyl-1-propionyloxycyclohexane (cis/trans)
1-Acetoxy-2-sec-butyl-1-vinylcyclohexane (cis/trans) (C)
1-Acetoxy-2-sec-butyl-1-ethynylcyclopentane (cis/trans)
1-Acetoxy-2-tert-butyl-1-ethynylcyclohexane (cis/trans)
2-tert-Butyl-1-ethynylcyclohexanol (cis/trans).
1-Acetoxy-2-sec-butyl-1-ethynylcycloheptane (cis/trans)
1-Acetoxy-2-iso-butyl-1-ethynylcyclohexane (cis/trans)
1-Acetoxy-2-n-butyl-ethynylcyclohexane (cis/trans)
1-Acetoxy-2-sec-butyl-1-ethylcyclohexane (cis/trans) (I)
1-Acetoxy-2-sec-butyl-1-(1-propynyl)-cyclohexane (cis/trans)

The odorant quality of the compounds of the present invention and certain other compounds of related structure are summarized below. In accordance with the typical structure of compounds (II) and (III) above in the following table $n = 1$ means a cyclohexane nucleus, $n = 2$ means a cycloheptane nucleus and $n = o$ means a cyclopentane nucleus. The numbers at the head of each column indicate the positions in said nucleus of the substituents listed in the column.

| | 1 | 1 | 2 | 3 | 4 | Odor |
|---|---|---|---|---|---|---|
| (A) | $n=1$ OH | C≡CH | sec—Bu | / | / | cis/trans: Powerful earthy, mossy |
| (D) | do. | do. | do. | do. | do. | cis: musty, fresh earthy |
| (E) | do. | do. | do. | do. | do. | trans: musty minty earthy |
| | do. | do. | n—Bu | do. | do. | cis/trans: spicy, floral, anethole |
| | do. | Ethyl | sec—Bu | do. | do. | cis/trans. fresh, minty |
| | do. | Vinyl | do. | do. | do. | do. |
| | do. | C≡C—CH$_3$ | do. | do. | do. | cis/trans: woody, ambergris, green |
| (B) | CH$_3$COO— | C≡CH | do. | do. | do. | cis/trans: intense, diffusive woody-cedar-musty-ambergris |
| (F) | CH$_3$COO— | C≡CH | sec—Bu | / | / | cis: woody, earthy, musty ambergris |
| (G) | do. | do. | do. | do. | do. | trans: strong, woody vetiverate, ambergris |
| (H) | H.COO— | do. | do. | do. | do. | cis/trans: woody, ambergris |
| | C$_2$H$_5$.COO— | do. | do. | do. | do. | cis/trans: sweet, musty, woody |
| | CH$_3$COO | do. | tert—Bu | do. | do. | cis/trans: woody, ambergris |
| (C) | do. | Vinyl | sec—Bu | do. | do. | cis/trans: woody, ambergris |
| | do. | C≡CH | n—Bu | do. | do. | cis/trans: woody, spicy |
| | do. | do. | iso—Bu | do. | do. | cis/trans: warm, woody, tobacco |
| (I) | do. | Ethyl | sec—Bu | do. | do. | cis/trans: woody, ambergris |
| | do. | —C≡C—CH$_3$ | do. | do. | do. | cis/trans: woody |

| 1 | 1 | 2 | 3 | 4 | Odor |
|---|---|---|---|---|------|
| OH | C≡CH | tert—Bu | / | / | cis/trans: fresh, camphor woody |
| do. | do. | iso—Bu | do. | do. | cis/trans: musty, minty |
| OH | do. | / | sec—Bu | do. | camphoraceous |
| CH$_3$COO | do. | do. | do. | do. | cis/trans: weak, spicy peppery |
| do. | / | sec—Bu | / | / | cis/trans: weak, minty |
| do. | C≡CH | cyclohexyl | / | / | cis/trans: none |
| OH | do. | iso-propyl | / | / | cis/trans: camphoraceous |
| do. | do. | / | / | tert—Bu. | cis/trans: weak, oily |
| CH$_3$COO | do. | do. | do. | do. | cis/trans: weak, ethereal |
| CH$_3$COO | C≡CH | / | / | sec—Bu. | cis/trans: weak, woody, trace peppery |
| HO | do. | do. | do. | do. | cis/trans: weak, floral |
| $n=0$ HO | C≡CH | sec—Bu | / | / | cis/trans: strong, earthy |
| CH$_3$COO | do. | do. | / | / | cis/trans: woody, vetiver acetate cedar |
| $n=2$ HO | C≡CH | do. | / | / | cis/trans: spicy, caryophyllene |
| CH$_3$COO | do. | do. | / | / | cis/trans: warm, woody, cedar |

(wherein Bu = Butyl)

Certain of the above aroma chemicals were compounded into the following citrus cologne formulations. Their performance was tested by observing the odor of the cologne with and without the aroma chemical.

CITRUS COLOGNE

|  | A | B | C | D | E | F | G | H | I |
|---|---|---|---|---|---|---|---|---|---|
| Aroma Chemical | 30 | 10 | 30 | 30 | 50 | 10 | 10 | 30 | 30 |
| Benzyl iso eugenol | 27 | 27 | 27 | 27 | 26 | 27 | 27 | 27 | 27 |
| Bergamot oil | 291 | 298 | 271 | 291 | 286 | 298 | 298 | 291 | 291 |
| Geranium oil | 10 | 11 | 10 | 10 | 10 | 11 | 11 | 10 | 10 |
| Lavender oil | 32 | 33 | 32 | 32 | 31 | 33 | 33 | 32 | 32 |
| Lemon oil | 273 | 275 | 273 | 273 | 265 | 275 | 275 | 273 | 273 |
| Lime oil | 54 | 55 | 54 | 54 | 53 | 55 | 55 | 54 | 54 |
| Neroli oil | 10 | 11 | 10 | 10 | 10 | 11 | 11 | 10 | 10 |
| Orange bitter | 140 | 143 | 140 | 140 | 138 | 143 | 143 | 140 | 140 |
| Orange sweet | 75 | 77 | 75 | 75 | 74 | 77 | 77 | 75 | 75 |
| Rosemary oil | 32 | 33 | 32 | 32 | 31 | 33 | 33 | 32 | 32 |
| Sage clary oil | 21 | 22 | 21 | 21 | 21 | 22 | 22 | 21 | 21 |
| Thyme oil (white) | 5 | 5 | 5 | 5 | 5 | 5 | 5 | 5 | 5 |
|  | 1000 | 1000 | 1000 | 1000 | 1000 | 1000 | 1000 | 1000 | 1000 |

For the most part, the aroma chemicals herein evaluated can be used in perfume formulations in a practical range extending from 0.1 to 20 percent. This will vary, of course, depending upon the type of fragrance formula involved. In the above cologne, the best results were obtained when the aroma chemicals were used in the range of 1 to 5 percent. Higher concentrations above 20 percent (i.e., 80–90 percent) may be used successfully for special effects.

2-sec-Butyl-1-ethynylcyclohexanol, mixture of cis and trans

This mixture of cis and trans alcohol has a very mossy-earthy odor. The addition of 3% of 2-sec-butyl-1-ethynylcyclohexanol to the test cologne gives a soft earthy note to the fragrance with an unusual freshness which makes the cologne a superior perfume. Without 2-sec-butyl-1-ethynylcyclohexanol the cologne did not have the unique freshness and strength.

1-Acetoxy-2-sec-butyl-1-ethynylcyclohexane, mixture of cis and trans

This mixture of cis and trans acetate has a strong woody-woody amber odor. The addition of 1% of 1-acetoxy-2-sec-butyl-1-ethynylcyclohexane to the test cologne adds a rich warm woody character. The cologne without 1-acetoxy-2-sec-butyl-1-ethynylcyclohexane is thin and not as pleasing. The richness and balance contributed by 1-acetoxy-2-sec-butyl-1-ethynylcyclohexane in this case is outstanding.

1-Acetoxy-2-sec-butyl-1-vinylcyclohexane (cis/trans)

This mixture of the cis and trans acetate has a woody amber odor but is not as strong as 1-acetoxy-2-sec-butyl-1-ethynylcyclohexane. The addition of 3% of 1-acetoxy-2-sec-butyl-1-vinylcyclohexane to the cologne adds a warm woody note to the fragrance and contributes to the overall balance of the fragrance. The cologne without 1-acetoxy-2-sec-butyl-1-vinylcyclohexane is inferior and not as desirable as the cologne containing 1-acetoxy-2-sec-butyl-1-vinylcyclohexane.

2-sec-Butyl-1-ethynylcyclohexanol (cis)

The pure cis isomer of 2-sec-butyl-1-ethynylcyclohexanol has a very fresh earthly odor. The addition of 3% of this material to the cologne gives a very refreshing green earthy effect. The cologne with 2-sec-butyl-1-ethynylcyclohexanol cis is more pleasing and is preferred over that without 2-sec-butyl-1-ethynylcyclohexanol (cis).

2-sec-Butyl-1-ethynylcyclohexanol (trans)

The pure trans isomer of 2-sec-butyl-1-ethynylcyclohexanol has an earthy-minty odor. The addition of 5% of trans-2-sec-butyl-1-ethynylcyclohexanol to the cologne formulation gave a freshness which tended to be more minty in effect than the cis isomer, 2-sec-butyl-1-ethynylcyclohexanol. The cologne containing 2-sec-butyl-1-ethynylcyclohexanol (trans) was more appealing and of more perfume value than the cologne without 2-sec-butyl-1-ethynylcyclohexanol (trans).

1-Acetoxy-2-sec-butyl-1-ethynylcyclohexane (cis)

The pure cis isomer of 1-acetoxy-2-sec-butyl-1-ethynylcyclohexane has a strong woody, amber odor. The addition of 1% of 1-acetoxy-2-sec-butyl-1-ethynylcyclohexane (cis) to the cologne formula produced a very pleasing woody note and contributed a considerable amount of strength to the fragrance. The cologne without 1-acetoxy-2-sec-butyl-1-ethynylcyclohexane (cis) was inferior and lacking in body and strength.

1-Acetoxy-2-sec-butyl-1-ethynylcyclohexane (trans)

The pure trans isomer of 1-acetoxy-2-sec-butyl-1-ethynylcyclohexane, has a strong, rich woody odor. The addition of 1% of 1-acetoxy -2-sec-butyl-1-ethynylcyclohexane (trans) to the cologne formula produced a rich woody character which gave a much more desirable product than the cologne without 1-acetoxy-2-sec-butyl-1-ethynylcyclohexane (trans).

2-sec-Butyl-1-ethynyl-1-formyloxycyclohexane (cis/trans)

This mixture of cis-trans formates has a woody-amber odor but is a little weaker than the acetate. The addition of 3% of 2-sec-butyl-1-ethynyl-1-formyloxycyclohexane to the cologne formula, produced a pleasing warm woody effect. The cologne containing 2-sec-butyl-1-ethynyl-1-formyloxycyclohexane (cis/trans) was considered of more perfume value than that without 2-sec-butyl-1-ethynyl-1-formyloxycyclohexane (cis/trans).

1-Acetoxy-2-sec-butyl-1-ethylcyclohexane (cis/trans)

This mixture of acetate has a woody-amber odor. The addition of 3% of 1-acetoxy-2-sec-butyl-1-ethylcyclohexane to the test cologne produced a pleasing warm-woody effect. The cologne containing 1-acetoxy-2-sec-butyl-1-ethylcyclohexane was considered of more perfume value than that without 1-acetoxy-2-sec-butyl-1-ethylcyclohexane.

Conclusion

The esters of the various derivatives of 2-sec-butyl-1-ethynylcyclohexanol for the most part have woody-amber odors which perform consistently well in perfume formulations. Desirable effects are produced which include added strength and warmth. Moreover, these esters, in varying degrees, have the ability to contribute a modification which improves the overall balance of the perfume. The most useful of these, 1-acetoxy-2-sec-butyl-1-ethynyl-cyclohexane (cis and trans) (B) is an outstanding aroma chemical in all respects.

2-sec-Butyl-1-ethynylcyclohexanol, (A), is a desirable aroma chemical in its own right and can be used extensively in many types of fragrances in which it will contribute the fresh earthiness demonstrated above.

SPECIFIC COMPARISON OF ODOR STRENGTHS

Tests were carried out to compare the odor strengths of 2-sec-butyl-1-ethynylcyclohexanol and the acetate thereof, both the cis and trans form to the corresponding 3-sec-butyl and 4-sec-butyl isomers; the latter being the weaker odors. In this experiment 1:1 solutions of the odorants in propylene glycol were prepared. The stronger odors were further diluted. Samples were then placed on smelling blotters. The relative odor strength was determined by the degree of dilution required for the stronger odors to achieve the same odor strength as the weaker odors. The results of these tests are summarized below:

| | |
|---|---|
| cis-2-sec-butyl-1-ethynylcyclohexanol<br>trans-2-sec-butyl-1-ethynylcyclohexanol | 4 × cis/trans-4-sec-butyl-1-ethynyl-cyclohexanol |
| cis/trans-2-sec-butyl-1-ethynylcyclo-hexanol | 2 × cis/trans-3-sec-butyl-1-ethynyl-cyclohexanol |
| 1-acetoxy-cis-2-sec-butyl-1-ethynylcyclohexane<br>1-acetoxy-trans-2-sec-butyl-1-ethynylcyclohexane<br>1-acetoxy-cis/trans-2-sec-butyl-1-ethynylcyclohexane | 4 × > cis/trans-1-acetoxy 3-and 4-sec-butyl-ethynylcyclohexane |

The following examples include those in which cyclic ketones were converted to ethynylcycloalkanols via the described processes. These reactions were analyzed by a variety of methods including infrared spectroscopy, vapor phase chromatography and nuclear magnetic resonance spectroscopy. The products were characterized by infrared spectroscopy by noting the absence of a carbonyl band in the 5.8$\mu$ region (due to starting ketone) and the appearance of bands in the regions of 2.8$\mu$ (broad and characteristic of alcohols), 3.0$\mu$ (sharp and characteristic of C ≡ C—H) and 4.5$\mu$ (sharp and characteristic of —C ≡ C—).

The compounds were analyzed by vapor phase chromatography which, in most cases, gave distinct and separated peaks for the starting ketone, the cis and the trans k-alkyl-1-ethynylcycloalkanols ($k = 2,3,4$).

Complimentary to vapor phase chromatography was nuclear magnetic resonance spectroscopy. In the cases studied the chemical shift of the ethynyl proton of the cis isomer differed from that of the trans. The NMR of cis/trans mixtures revealed two sharp singlets in the region $\tau$7.4– 7.6 which were separated by anywhere from 0.3 to 0.5 units. These were assigned to the ethynyl protons (C ≡ CH) of the two isomers. The ratio of these two signals, when integrated, correspond to the ratio of cis:trans isomers as obtained by vapor phase chromatography.

In a similar manner the corresponding acetates derived from the ethynylcycloalkanols were characterized in the infrared by the absence of the 2.8$\mu$ band (characteristic of the starting alcohols) and the appearance of an ester carbonyl at 5.8$\mu$. The bands at 3.0$\mu$ and 4.5$\mu$ due to the acetylene moiety remain.

The NMR of the acetates is characterized by ethynyl proton resonances appearing in the range $\tau$7.3 to $\tau$7.5. (Once again, mixtures of cis and trans isomers show distinct peaks). In addition there is a sharp singlet in the region $\tau$7.9 to $\tau$8.0 assigned to the acetoxy methyl

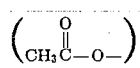

protons. In cases where a cis, trans mixture was run two distinct signals could be noted which, when integrated, correspond to the cis-trans ratio. Temperatures are in °C, except where indicated $n = 1$.

EXAMPLE I 2-sec-Butyl-1-ethynylcyclohexanol (cis,trans), (IIb)

Lithium acetylide ethylenediamine complex (255 g) and dry benzene (2,040 ml) were charged into a 5.1 flask fitted with a sealed stirrer, a thermometer, a dropping funnel, a gas inlet tube (not dipping into the liquid) and a reflux condenser with drying tube. Dry nitrogen was introduced through the reaction.

2-sec-Butylcyclohexanone (393 g) was added at 40° over a period of 1 hour to the agitated suspension. Agitation was then continued for 6 hours at 43°–45°.

After cooling to 20°, water (1,200 ml) was added over a period of 30 minutes. Agitation was continued for 18 hours.

The benzene layer was washed three times with water. After drying with anhydrous sodium sulfate and filtration, the benzene was distilled at a pressure of 250 mm of mercury. The residual brown oil weighed 407 g. V.P.C. analysis indicated 25% of starting ketone and 47% of cis- and 28% of trans-2-sec-butyl-1-ethynylcyclohexanol.

The product was fractionated by means of a 37 inch column, filled with glass helices, and equipped with variable reflux take-off.

After removal of fractions, containing mostly starting ketone and intermediary fractions of ketone and mostly cis-product, a blend of cis- and trans was collected, distilling at 56°–60° at a pressure of 0.2 – 0.1 mm. Yield: 198.4 g; V.P.C. 56.5% cis, 42.4% trans; water-white liquid.

Analysis for $C_{12}H_{20}O$, Calcd C, 79.94; H, 11.18; Found C, 79.78; H, 11.18;

$n_D^{20}$ : 1.4797

Odor: Earthy, mossy, powerful note.

EXAMPLE II 2-sec-Butyl-1-ethynylcyclohexanol (cis,trans) (IIb)

Powdered potassium hydroxide (112 g) and methylal (230 g) were charged into a 1 l. flask fitted with a sealed stirrer, a thermometer, a gas inlet tube and a reflux condenser.

Acetylene was passed into the agitated mixture, over a period of 30 minutes maintaining a temperature of —10°.

2-sec-Butylcyclohexanone was added over a period of 4 hours at —10° to —5°, acetylene being passed into the batch simultaneously. Agitation and injection of acetylene was continued for an additional 2 hours.

Water (500 ml) was added to the cooled reaction mixture. An oily layer separated. The aqueous layer was extracted with toluene (200 ml). The extract was combined with the oily layer. The solvent was distilled at reduced pressure. The residual oil weighed 86.5g. after drying at a pressure of 5 mm at a temperature of 50°.

V.P.C. analysis (175°, 20M) indicated 47.9% cis, 22.5% trans alcohols; rest: starting ketone.

EXAMPLE III 2-sec-Butyl-1-ethynylcyclohexanol (cis, trans) (IIb)

Liquid ammonia (500 ml) was charged into a 2 l. insulated flask fitted with a sealed stirrer, a thermometer, a gas inlet tube and a dry ice condenser. Acetylene was passed into the ammonia for a period of 5 minutes. Sodium (25 g) was dissolved into the ammonia by gradual addition during 45 minutes, the acetylene stream being continued. 2-sec-Butylcyclohexanone (155 g) in dry toluene (100 ml) was added over a period of 3 hours, continuing the acetylene stream.

Agitation was continued for 2 ½ hours. The acetylene was passed in at a somewhat slower rate.

The part of the ammonia which had evaporated was replaced by an equal volume of liquid ammonia. After standing overnight, most of the ammonia was evaporated by inserting the flask in a warm water-bath. As the batch temperature reached 0°, a solution of 58 g of ammonium chloride in 300 ml of water was added slowly, the flask being cooled in an ice-methanol bath.

Then, dilute sulfuric acid (180 g of 93% $H_2SO_4$ and 351 g of ice-water) was added slowly to the cooled reaction mixture.

The toluene layer was separated and washed neutral with water. The dried solution was freed of the solvent by distillation at reduced pressure. The residual yellowish oil was dried at a pressure of 5 mm at a temperature of 50°.

Yield: 167 g.

V.P.C. analysis (175°, 20M): 42.1% starting ketone, 44.6% cis alcohol, 12.5% trans alcohol.

EXAMPLE IV 2-sec-Butyl-1-ethynylcyclohexanol (cis), (IIb, n = 1)

This compound was obtained by fractionation of the crude reaction product of Example I using a 2 ft. Goodloe column with variable reflux take off. The progress of the separation of the cis isomer from unreacted ketone and the trans isomer was monitored by V.P.C. analysis.

The cis isomer distilled at 49°–50° at a pressure of 0.08 mm. NMR $(CDCl_3)\tau7.52$ (C $\equiv$ CH). It is a water-white liquid, $n_D^{20}$ 1.4778. Odor: Musty, fresh earthy.

EXAMPLE V 2-sec-Butyl-1-ethynylcyclohexanol (trans) (IIb, n = 1)

This compound was obtained in accordance with the procedure of Example IV; b.p. 52°–54°/0.08 mm; NMR: $(CDCl_3)\tau7.56$ (C $\equiv$ CH) water-white liquid; $n_D^{20}$ : 1.4824. Odor: musty, minty earthy.

EXAMPLE VI 2-sec-Butyl cyclopentanone (Ib. n = O)

A mixture of cyclopentanone (1 mole), 99 g (1 mole) of cyclohexylamine and 300 ml of benzene were refluxed until the theoretical amount of water (18 ml) was separated in a Dean and Stark tube. The residue is cyclopentylidene cyclohexylamine.

To 473 ml (1.35 mole) of a 2.9 molar solution of methyl magnesium chloride refluxing under a blanket of dry nitrogen was added 231.4 g (1.4 mole) of cyclopentylidene cyclohexylamine at a rate which was determined by the rate of gas evolution (methane) as measured by a gas meter. The mixture was refluxed an additional 15 min. before adding 205 g (1.5 mole) of 2-bromobutane dropwise over a 2 hour period. After diluting with 200 ml of tetrahydrofuran the reaction was stirred an additional 16 hours at 65°–70° during which a solid precipitate formed.

The batch was then heated to reflux and the reflux maintained by adding dropwise (very slowly) 750 ml of 10% $H_2SO_4$ while at the same time distilling out the THF. The initial reaction is very exothermic, but once the active Grignard is decomposed a more rapid addition is allowed and external heating is needed to maintain reflux.

The crude oil was isolated via cohobation as it was formed during the hydrolysis. Distillation gave 68.7 g (35.8% of theory) of 2-sec-butyl cyclopehtanone as a colorless liquid b.p. (7 mm) = 68°C, $n_D^{20}$ = 1.4494.

EXAMPLE VII 2-sec-Butyl-1-ethynylcyclopentanol (IIb, n = 0)

To a mixture of 48 g of lithium acetylide ethylenediamine complex in 120 ml toluene and 120 ml tetrahydrofuran was added 53 g of 2-sec-butylcyclopentanone in the manner described in Example I.

After 120 ml water had been added to decompose the lithium salts, 200 ml ether was added to aid separation and the organic layer was washed with 100 g $H_2O$. The organic layer was a thick emulsion and was washed with 10% HCl to break it up. It was then neutral with water, concentrated to an oil and distilled on a 9 inch column packed with glass helices. Separation was difficult but 8.5 g. of pure ethynyl alcohol b.p. 93° at 8 mm, $n_D^{20}$ 1.4772 was obtained. The IR showed no carbonyl and did show the characteristic bands for C $\equiv$ CH and —OH.

Integration of the ethynyl proton (C $\equiv$ CH) resonances at $\tau7.43$ and $\tau7.49$ indicated a cis:trans ratio of 3:2. Odor: Strong, earthy.

EXAMPLE VIII 2-sec-Butyl-cycloheptanone (Ib, n = 2)

In accordance with the procedure of Example VI, but using 0.7 molar quantities and using cycloheptanone in place of cyclopentanone there was obtained cycloheptylidene cyclohexylamine, which was further reacted in accordance with the procedure of Example VI, with the exception that 10% HCl was used for the hydrolysis step. After 4 hours reflux in the aqueous HCl it was found that the bulk of the material could not be extracted with ether. The batch was then neutralized with solid soda ash, made basic with 10% NaOH and extracted with methylene chloride. After washing neutral, concentrating to an oil and distillation there was obtained N-(2-sec-butyl) cycloheptylidene cyclohexylamine 75.0 g (43% theory) a yellowish oil b.p. (3.0 mm) = 143°C; $n_D^{20}$ = 1.4930.

Anal. Calcd for $C_{17}H_{31}N$: C, 81.85; H, 12.53; N, 5.62.

Found: C, 81.42; H, 12.38; N, 5.56.

63.2 g N-(2-sec-butyl)cycloheptylidene cyclohexylamine (.25 mole) in 500 ml of 20% $H_2SO_4$ was refluxed for 100 hours during which time 29.8 g (71% theory) of crude 2-sec-butyl-cycloheptanone was recovered by cohobation. Distillation gave a colorless oil b.p.(1.5 mm) = 76°C; $n_D^{20}$ = 1.4641.

EXAMPLE IX 2-sec-Butyl-1-ethynylcycloheptanol (IIb) (n = 2)

20 g of lithium acetylide ethylenediamine complex in 100ml toluene was reacted with 30 g 2-sec-butylcycloheptanone in accordance with the procedure as described in Example I.

VPC of the crude showed 57% of the ketone unreacted. Since the ketone was difficult to separate by distillation, two distillations were necessary to obtain 5.1 g of product (93% pure by VPC) 20M.

$n_D^{20}$ 1.4830; IR shows characteristic bands. NMR integration of ethynyl proton (C $\equiv$ C—H) resonances at $\tau7.58$ and $\tau7.51$ shows a cis and trans mixture in a ratio of 7 to 1.

Odor: Spicy, caryophyllene.

EXAMPLE X 2-iso-Butyl-1-ethynylcyclohexanol (IId)

7.0 g of 2-iso-butylcyclohexanone was reacted with 5 g of lithium acetylide ethylenediamine complex in 12 ml toluene and 12 ml tetrahydrofuran as described in Example I.

Distillation on a short path micro still afforded 0.8 g of 94.5% pure (VPC, 20M) of ethynyl alcohol, b.p. 64°–64.5° at 0.5 mm; $n_D^{20}$ 1.4740.

IR shows expected bands for C ≡ CH and —OH and only trace carbonyl. The cis and trans isomers were not resolved in VPC but NMR integration of the ethynyl proton (C ≡ C—H) resonances indicated a cis and a trans mixtures in the ratio of 3:2.

Odor: musty, minty.

EXAMPLE XI 2-n-Butyl-1-ethynylcyclohexanol (IIa)

7.0 g (.045 mole) of 2-n-butylcyclohexanone was reacted with 5 g(.05 mole) of lithium acetylide ethylenediamine complex in 12 ml toluene and 12 ml tetrahydrofuran as described in Example I.

Distillation in a short path micro still afforded 1.5 g of ethynyl alcohol (97.5% pure by VPC). b.p. 78°C at 0.5 mm. $n_D^{20}$ 1.4758.

IR shows characteristic bands for C ≡ CH and OH and only trace of carbonyl. The cis and trans isomers were not resolved in VPC but NMR integration of the ethynyl proton (C ≡ C—H) resonances indicated a cis and trans mixture in the ratio of 3:2.

Odor: Spicy, floral, anethole.

EXAMPLE XII 2-sec-Butyl-1-ethylcyclohexanol (VII b)

A Grignard solution was prepared from magnesium (12.2 g), ethyl bromide (55 g) and ethyl ether (325 ml) in a 1 l. flask fitted with a sealed stirrer, a thermometer, a reflux condenser (drying tube) and a dropping funnel.

2-sec-Butylcyclohexanone (77 g) in ethyl ether (100 ml) was added to the agitated Grignard solution over a period of 45 minutes maintaining slight reflux. After refluxing an additional 5 hours and standing overnight, ammonium chloride solution was added. The ethereal solution was washed with water, dried and filtered. The ether was distilled. Yield of the residual oil: 81.5 g. V.P.C. about 35% of starting ketone, about 61% of 2-sec-butyl-1-ethylcyclohexanol (58% isomers A, 3% isomer B).

The crude product was fractionated through a 24 inch column fitted with glass helices. The fraction, going over at 53°–56° at a pressure of 0.2–0.3 mm (41.1 g) was redistilled through a 25 inch spiral column: 26.9 g of water-white liquid; b.p. 3 mm: 93.94° $n_D^{20}$ : 1.4713.

Odor: fresh minty.
IR indicates OH (strong) and a trace of CO.
V.P.C. indicates 97.8% of isomer A (cis) and 1.6% of isomer B (trans).

EXAMPLE XIII 2-sec-Butyl-1-vinylcyclohexanol (VIb)

1-Acetoxy-2-sec-butyl-1-vinylcyclohexane (8.9 g), alcohol (50 ml) and a solution of sodium hydroxide (4 g) in water (5 ml) were agitated and refluxed for 4 hours.

The solution was freed of solvent by distillation at reduced pressure. Ice-water (100 ml) was added and the mixture was acidified with dilute sulfuric acid. The organic layer was extracted with hexane (50 ml); the extract was washed with water and dried with anhydrous sodium sulfate. After filtration, the hexane was distilled at reduced pressure. The residual oil (7.1 g) was distilled at a pressure of 0.08 mm. The desired alcohol (5.1 g) had a b.p. of 50°–56°.

IR: Compatible.
$n_D^{20}$ : 1.4817.
Odor: fresh minty.

EXAMPLE XIV 2-sec-Butyl-1-(1-propynyl) cyclohexanol (VIIIb)

A Grignard solution was prepared from magnesium (14.5 g) and bromoethane (72 g) in tetrahydrofuran (400 ml). The preparation was carried out under nitrogen at a temperature not exceeding 38°.

A stream of methylacetylene was introduced over a period of 150 minutes, the batch being agitated and maintained at a temperature of 35° at the beginning and 32° at the end.

2-sec-Butylcyclohexanone (77 g) was added at 25°–30° over a period of 30 minutes. After agitation for 15 hours (under nitrogen) at room temperature, the temperature was raised to 35° for 4 hours. Ammonium chloride solution was added and the alcohol was extracted with toluene.

The crude product (97.3 ) was obtained as residue after distillation of the toluene at reduced pressure. V.P.C. analysis indicated 1.9% toluene, 3.9% starting ketone, 72.4% cis alcohol and 21.4% trans alcohol.

Fractionation through a 2 ft. column (fitted with glass helices) furnished the pure product, boiling at 88°—90° at a pressure of 1 mm. It contained 72.6% of the cis isomer and 27.4% of the trans isomer.

$n_D^{20}$ : 1.4848.

|  |  | Calcd. | Found |
|---|---|---|---|
| Analysis for $C_{13}H_{22}O$: | %C | 80.35 | 80.4 |
|  | %H | 11.41 | 11.34 |
| Odor: Green, woody, ambergris. | | | |

EXAMPLE XV

1-Acetoxy-2-sec-butyl-1-ethynylcyclohexane (IIIb)

2-sec-Butyl-1-ethynylcyclohexanol (142.3 g, 56.5% cis, 42.4% trans) and acetic anhydride (400 ml) were agitated and refluxed (temperature of batch: 143°) in a suitable vessel for 3 hours. After cooling to 80°, the batch was quenched on ice. The acetic acid was neutralized with sodium bicarbonate. The organic layer was taken up in hexane and washed several times with water. After drying with anhydrous sodium sulfate and filtration, the hexane was distilled at a pressure of 250 mm. The residual yellowish oil weighed 161 g. It was fractionated by means of a 37 inch column fitted with glass helices and equipped with variable reflux take-off.

After removal of fractions containing starting material and a blend of starting material and ester (monitored by IR analysis), the pure desired compound distilled at 84.5°– 86° at a pressure of 1.2–0.9 mm.

Yield: 95.3 g; water-white liquid.

$n_D^{20}$: 1.4711.

|  |  | Calcd. | Found |
|---|---|---|---|
| Analysis for $C_{14}H_{22}O_2$ | % C | 75.63 | 75.86 |
|  | % H | 9.97 | 10.03 |
|  | A.V. | 0 | 0 |
|  | S.V. | 252 | 254 |
| T.L.C. One spot. | | | |

Odor: Intense, diffusive, woody-cedar-musty odor, suggestive of ambergris, very interesting and useful odor. The NMR shows two ethynyl proton (—C≡C—H) resonances at τ 7.36 and τ7.42 and two methyl singlets of the acetyl group

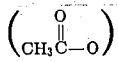

at τ 7.98 and τ7.94.

EXAMPLE XVI

1-Acetoxy-2-sec-butyl-1-ethynylcyclohexane 2-sec-Butyl-1-ethynylcyclohexanol, obainted by ethynylation of 2-sec-butylcyclohexanone with acetylene in liquid ammonia in the presence of sodium acetylide, (119.5 g), consisting of 12–14% of 2-sec-butylcyclohexanone, 65–68% of cis-and 20% of trans-alcohol was placed into a 250 ml flask fitted with a sealed stirrer, a reflux condenser with drying tube, a thermometer and a dropping funnel.

A mixture of acetic anhydride (84 g) and 85% phosphoric acid (1g) was added to the agitated charge according to the following schedule.

About half of the acetylating agent was added over a period of 10 minutes. The temperature rose from 26° to 30°. After a pause of 6 minutes, addition was resumed and finished after 30 minutes. Final temperature: 38°.

The batch was then moderately agitated for 110 hours at room temperature and an additional 3 hours at 50°.

The crude product was dissolved in toluene (300 g.); the solution was quenched on ice. After standing overnight, the aqueous layer was separated in a separatory funnel. The toluene layer was washed once with a 10% sodium bicarbonate solution (200 g) and then four times with water. It was dried with anhydrous Na$_2$SO$_4$, filtered and freed of the solvent by distillation at a pressure of 60 mm. Toluene recovered (280 g).

The residual oil was dried for 15 minutes at 50° at a pressure of 2 mm of mercury. Yield: 143.5 g of crude ester.

|       | Calcd. | Found         |
|-------|--------|---------------|
| A. V. | 0      | 0             |
| S. V. | 252    | 227, purity:  | about 90%: I. R.. The lack of OH absorption indicated complete esterification.

The crude ester (141 g) was fractionated at a pressure of 1.3 mm using a 2 ft column fitted with glass helices and equipped with variable reflux take-off. The progress of the fractionation was monitored by I.R.

Fractions boiling at 88°–91°, with strong C≡C and acetate absorption, free of keto CO absorption were collected and bulked. Yield: 108.2 g; S.V.: 253; purity: 100%; Odor: Strong, woody, ambergris.

The NMR shows two ethynyl proton (—C≡C—H) resonances at τ7.36 and τ7.42 (3:1 ratio) and two methyl singlets of the acetyl group

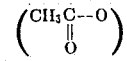

at τ 7.98 and τ 7.94 (3: 1 ratio).

EXAMPLE XVII

1-Acetoxy-2-sec-butyl-1-ethynylcyclohexane (cis) (IIIb)

2-sec-Butyl-1-ethynylcyclohexanol (cis) (36g) was charged into a 250 ml flask fitted with a sealed stirrer, a thermometer, a reflux condenser with drying tube and a dropping funnel.

A mixture of acetic anhydride (26 g) and 85% phosphoric acid (0.3 g) was added over a period of 1 hour. The temperature rose from 26° to 33°. Agitation was continued for 48 hours. Then, the batch was heated 3 hours at 50°. After quenching on ice and neutralization with sodium bicarbonate, the ester was extracted with toluene. The extract was washed three times with water, dried, filtered and freed of the solvent at a pressure of 200 mm.

The residual oil (40.1 g) was fractionated through a 25 inches spiral column.

The fraction (14 g) going over at 97° at a pressure of 1.5 mm was the desired compound as indicated by IR. NMR had a 1 proton singlet at τ7.36 assigned to the ethynyl proton (C≡CH) and a 3 proton singlet at τ7.98 assigned to the acetoxy methyl

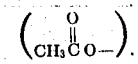

$n_D^{20}$ : 1.4701

Odor: Woody, earthy, musty, ambergris.

EXAMPLE XVIII

1-Acetoxy-2-sec-butyl-1-ethynylcyclohexane (trans) (IIIb)

Following the procedure for the preceding cis compound in Example XVII but starting with 2-sec-butyl-1-ethynylcyclohexanol (trans, 36 g), 12.2 go of the desired ester were obtained. B.p. 97°–98°, 1.5 mm. IR and NMR are compatible with the indicated structure. The NMR had a 1 proton singlet at τ7.42 assigned to the ethynyl proton (C≡CH) and a three proton singlet at τ7.94 assigned to the acetoxy methyl

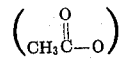

$n_D^{20}$ : 1.4717

Odor: Strong, woody, vetiver acetate ambergris.

EXAMPLE XIX 2-sec-Butyl-1-ethynyl-1-formyloxycyclohexane (IIIb)

Formic acid (17.6 g) was charged into a 250 ml flask fitted with a sealed stirrer, a thermometer, a dropping funnel and a drying tube.

Acetic anhydride (40 g) was added to the agitated formic acid keeping the temperture below 15°. After heating for 5 minutes at 50°, the mixture was cooled to 5°.

2-sec-Butyl-1-ethynylcyclohexanol (63.5 g, 57.5% cis, 41.4% trans, 1.1% 2-sec-butylcyclohexanone) was added to the agitated mixtue at 5°–10° over a period of 1 hour.

The batch was agitated 5 hours at 10° and then for 4 ½ days at room temperature. After quenching on ice, the ester was extracted with petroleum ether. The ether was washed with sodium carbonate solution and water; the dried and filtered extract was freed of the solvent by distillation. Yield of the crude ester: 65.9 g.

It was fractionated through a 2 ft. Goodloe column.

The fraction (22.8 g) going over at 68°–71° at a pressure of 0.2 mm was redistilled (micro still) b.p. 72°–74° at 0.3 mm; yield 17.9 g.

IR indicates the absence of OH, the presence of C≡C—H and H—COO.

NMR is compatible with the assigned structure.

$n_D^{20}$ : 1.4760 odor: Similar to the acetate, very interesting, woody, ambergris.

VPC: 150° 20 M. Decomposition.

EXAMPLE XX 2-sec-Butyl-1-ethynyl-1propionyloxycyclohexane (IIIb)

2-sec-Butyl-1-ethynylcyclohexanol (46.5 g), toluene (100 ml) and propionic anhydride (70 g) were agitated and refluxed 5 hours in a suitable vessel. After quenching on ice, neutralization with sodium bicarbonate, washing the toluene layer with water, drying and filtering, the solvent was removed by distillation at a pressure of 200 mm. The residual oil was fractionated through a 25 inches spiral column. The fraction which went over at 105°–110° (11.4 g) at a pressure of 2.4 mm was the desired ester as indicated by IR analysis.

$n_D^{20}$ : 1.4707.

Odor; Sweet, musty, woody

EXAMPLE XXI

1-Acetoxy-2-sec-butyl-1-vinylcyclohexane (IVb,n = 1)

1-Acetoxy-2-sec-butyl-ethynylcyclohexane 66 g. (mixture cis, trans, about 1:1) dissolved in hexane (20 ml) was hydrogenated in a Parr bomb in the presence of Lindlar catalyst (0.25 g) at 45°–50° at a pressure of 45–50 lbs. of hydrogen over a period of 5 ½ hours.

Hexane (10 ml) and Lindlar catalyst (0.75 g) were added and the hydrogenation was continued under the above conditions for an additional 3 ½ hours.

Adding of hexane (10 ml) and of Lindlar's catalyst (0.75 g) was repeated, once, combined with hydrogenation for 1 ½ hours.

The solution was filtered from the catalyst; the solvent was distilled. The residual oil weighed 65.1 g.

Sixty g. of it were fractionated, using an 18 inches column filled with glass helices. The fraction (44g) going over at 73°–79° at a pressure of 0.6–0.7 mm was the desired hydrogenation product as indicated by IR analysis.

Redistillation yielded 31.5 g of 1-acetoxy-2-sec-butyl-1vinylcyclohexane; b.p. 95°/1 mm. The structure was confirmed by IR. The NMR shows three vinyl protons between the τ3.5 –τ5.5 region and the ethynyl proton was gone. Two methyl singlets due to the acetoxy

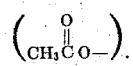

group at τ7.93 and 7.98 show this to be a cis trans mixture.

$n_D^{20}$ : 1.4691.

Odor: Woody, ambergris

EXAMPLE XXII

1-Acetoxy-2-sec-butyl-1-ethynylcyclopentane (IIIb,n = 0)

27.6 g. 2-sec-butyl-1-ethynylcyclopentanol (.165 m) was reacted with 17.4 g acetic anhydride and 0.2 g 85% phosphoric acid as described in Example XVI to yield 23.9 g of product; b.p. 84°C at 1.5 mm;

$n_D^{20}$ = 1.4660.

Odor; Woody, vetiver acetate, cedar.

EXAMPLE XXIII

1Acetoxy-2sec-butyl-1-ethynylcycloheptane (IIIb, n = 2)

16.5 g of 2-sec-butyl-1-ethynylcycloheptanol and 9.5 g of acetic anhydride and 0.2 ml 85% phosphoric acid as catalyst were reacted as described in Example XVI.

Yield: 12.3 g. b.p. 118° at 2.5 mm;

$n_d^{20}$ = 1.4756;

odor: warm, woody, note of cedarwood

EXAMPLE XXIV

1-Acetoxy-2-iso-butyl-1ethynylcyclohexane (IIId)

5.0 g of crude 2-iso-butyl-1-ethynylcyclohexanol, 3.5 ml acetic anhydride and 0.1 ml of 85% phosphoric acid were reacted as described in Example XVI to yield 3.6 g of product, b.p.83° C 0.5 mm.; $n_D^{20}$ =1.4649;

Odor; Warm, woody, tobacco, ambergris.

EXAMPLE XXV

1-Acetoxy-2-n-butyl-1-ethynycyclohexane (IIIa)

6.0 g of crude 2-n-butyl-1-ethynylcyclohexanol, 3.5 ml acetic anhydride and 0.1 ml of 85% phosphoric acid were reacted as described in Example XVI to yield 3.6 g product, b.p.79°–81°C0.5 mm; $n_D^{20}$ = 1.4660;

Odor: Woody, spice.

EXAMPLE XXVI

1-Acetoxy-2-sec-butyl-1-ethylcyclohexane (Vb)

A mixture of 11.1 g of 1-acetoxy-2-sec-butyl-1-ethynylcyclohexane, 100ml methanol, 1 g Raney nickel and 0.5 g soda ash was hydrogenated at 25°C and 50 p.s.i. to yield 6.0 g of product b.p.94° 1.5 mm.; $n_D^{20}$ = 1.4611; IR and NMR show acetate but no —OH, C≡CH,

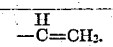

Odor: Woody, ambergris.

EXAMPLE XXVII

1-Acetoxy-2-sec-butyl-1-(1-propynyl)cyclohexane (IXb)

The corresponding propynyl alcohol (19 g) prepared in example XIV, acetic anhydride (15 g) and 85% phosphoric acid (0.16 g) were brought to reaction and worked up as being described in Example XVI.

The ester had a b.p. of 85°–90° at a pressure of 0.4 mm. IR indicated complete esterification by lack of OH absorption.

Odor: woody.

EXAMPLE XXVIII 3-sec-Butyl-1-ethynylcyclohexanol

Hydrogenation of 200 g (1.33 mole) of 2-sec-butylphenol in a Magnadrive autoclave at 160°C and 300 p.s.i. with 10 g of Raney Ni as catalyst yielded, after distillation, 192 g (92.3% theory) of a 60:40, cis:-trans mixture of 2-sec-butylcyclohexanol b.p. (4.0 mm) = 85°C; $n_D^{20}$ = 1.4702; NMR shows a broad peak at τ6.6. (CH(a)—OH(e)) and a sharper peak at τ5.93 (CH(e)—OH(a)) for the methine protons on the carbinol carbon of the two isomers.

A mixture of 312 g (2.0 mole) of 2-sec-butylcyclohexanol and 2.0 ml of 93% $H_2SO_4$ was heated to reflux and the water produced separated in a Dean Stark tube. After 90 minutes of reflux the water separation slowed down (35 ml collected) and the reaction mixture was cooled, washed neutral and distilled to yield 231 g (84% of theory) of sec-butylcyclohexene; b.p. (50 mm) = 90°C; $n_D^{20}$ = 1.4588. The mixture contains 3 isomers (A,B,C) in 75:12:13 ratio.

tert-Butyl chromate — To 290 ml of tert-butanol in a 1 l flask provided with an agitator and a system for adding solids, a slow addition (under a nitrogen atmosphere) of 100 g of solid chromic anhydride was initiated. At 10 minutes into the addition the temperature rose from 27°C to 48°C and a cooling bath was applied to lower the batch temperature to 28°C. At this point (5 minutes after the cooling bath had been applied) a stopper popped with a flash of light. An additional 5 minutes was required to add the remaining chromate during which time there was no further problems. The reaction mixture was then stirred for another 20 minutes. After adding 500 ml of dry carbon tetrachloride the reaction mixture was transferred to a separatory funnel using an additional 200 ml of carbon tetrachloride as washes. The organic layer was filtered through cotton, dried over sodium sulfate, concentrated to 500 ml at 300 mm pressure and used subsequently in the following synthetic step.

To the solution of tert-butyl chromate prepared above was added 159 ml glacial acetic acid and 64 ml of acetic anhydride. This solution was then added dropwise (over 2.0 hour period while employing a nitrogen atmosphere) to 34.6 grams (.25 mole) of sec-butylcyclohexene at 70°–80°C. The reaction mixture was heated an additional 2 hours at 70°–75°C, cooled to room temperature and allowed to sit in the dark overnight. A solution of 102 g oxalic acid in 1,025 ml $H_2O$ was added slowly over a 1.7 hour period while maintaining a temperature of 20°–25°C (some foaming noted). An additional 76.5 g of solid oxalic acid was added slowly (the first portions caused excessive foaming).

The layers were separated and the aqueous layer extracted with $CCl_4$. The organic layers were combined and washed with water, 10% sodium bicarbonate, neutral with water, concentrated and distilled to yield 11.7 g (31% of theory) of 1-sec-butylcyclohexen-3-one 90% pure by g.l.c. b.p. (3.0 mm) = 98°C; $n_D^{20}$ = 1.4882; NMR τ4.1 (1H) (s).

Hydrogenation of 10 g of 1-sec-butylcyclohexen-3-one at room temperature and 40 p.s.i. in a Parr Hydrogenator using 0.5 g 5% Pd/C as catalyst yielded, after distillation on a spinning band column, 4.5 g of 3-sec-butyl-cyclohexanone. b.p. (5.0 mm) = 88°C; $n_D^{20}$ = 1.4601.

4.6 g of 3-sec-butylcyclohexanone (0.030 mole) was reacted with 3.3 g lithium acetylide ethylenediamine complex in 7.5 ml toluene and 7.5 ml tetrahydrofuran as described in Example I.

After workup the resulting oil was distilled on a Nester/Faust Auto Annular Teflon Spinning Band Column to yield 0.7 g of 3-sec-butyl-1-ethynylcyclohexanol. b.p. 105°C at 5.0 mm, IR showed no carbonyl band and did show the characteristic bands for C ≡ CH and OH.
Odor: Camphoraceous.

EXAMPLE XXIX

1-Acetoxy-3-sec-butyl-1-ethynylcyclohexane 1.8 g. of 3-sec-butyl-1-ethynylcyclohexanol, 1.5 ml acetic anhydride and 0.02 ml 85% phosphoric acid were reacted as described previously to yield 1.1 g of product; b.p. 96°–98° C at 1 mm; $n_D^{20}$ = 1.4679.
Odor: Weak, spicy, peppery.

EXAMPLE XXX

1-Acetoxy-2-sec-butylcyclohexane

A mixture of 39.0 g 2-sec-butylcyclohexanol, 32 g of acetic anhydride, and 0.5 g. sodium acetate was refluxed (136°C) for 6 hours. After cooling to 100°C, 50 ml of water were added and the batch refluxed an additional 30 minutes. The batch was cooled to room temperature, diluted with hexane, and the layers separated. The organic layer was washed with 2 × 100 ml water, 2 × 50 ml 5% soda ash, and then neutral with water. Distillation yielded 37.4 grams of product; b.p. 80°C at 2 mm; $n_D^{20}$ = 1.4503,
Odor: Weak, minty.

EXAMPLE XXXI

1-Acetoxy-2-cyclohexyl-1-ethynylcyclohexane 37.2 g (0.18 mole) of 2-cyclohexyl-1-ethynylcyclohexanol was reacted with 23 g (0.225 mole) of acetic anhydride in the presence of 0.3 g 85% phosphoric acid as described previously: yield — 44.7 g of a solid, mp 55°–62°C. Recrystillization from 90 ml MeOH yielded 35 g white crystals mp 62°–65°C. IR showed strong ester bands and ethynyl bands;
Odor: none.

EXAMPLE XXXII

1-Ethynyl-2-isopropylcyclohexanol (cis,trans)

2-Isopropylcyclohexanone (28.2 g) in 50 ml of dry benzene and the lithium acetylide ethylenediamine complex (21 g) in 200 ml of dry benzene were brought to reaction and worked up as described in Example I.

The mixture of cis, trans alcohols had a b.p. of 47° at a pressure of 0.8 mm.

| Analysis of $C_{11}H_{18}O$ | | Calcd. | Found |
|---|---|---|---|
| | % C | 79.46 | 79.23 |
| | % H | 10.92 | 11.19 |
| Odor: Camphoraceous. | | | |

EXAMPLE XXXIII 2-tert-butyl-1-ethynylcyclohexanol (cis,trans) (IIB)

In accordance with the procedure of Example I but using 2-tert-butyl cyclohexanone in place of 2-secbutyl cyclohexanone there is obtained 2-tert-butyl-1-ethynylcyclohexanol b.p. 50°/1mm, $n_D^{20}$ 1.4831, 99.5% pure by V.P.C., Odor: fresh, camphor, woody.

EXAMPLE XXXIV

1-Acetoxy-2-tert-butyl-1-ethynylcyclohexane (cis,-trans) (IIIb)

In accordance with the procedure of Example XVI 2-tert-butyl-1-ethynyl cyclohexanol is reacted with acetic anhydride in the presence of phosphoric acid to yield 1-acetoxy-2-tert-butyl-1-ethynylcyclohexane b.p. 85°/1mm, $n_D^{20}$ 1.4791, Odor: woody, ambergris.

What is claimed is:

1. An odorant composition comprising a perfume mixture including an olfactible amount of a compound of the formula

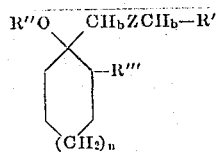

where
R' is hydrogen or methyl.
R'' is hydrogen or lower alkanoyl
R''' is butyl
$n$ is 0, 1 or 2; Z is a single, double, or triple bond, and
$b$ is correspondingly 2, 1, or 0.

2. An odorant composition comprising a perfume mixture including between 0.1 percent and 20 percent of a compound of the formula

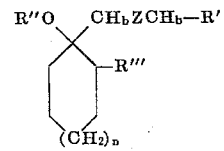

where R' is hydrogen or methyl.
R'' is hydrogen or lower alkanoyl
R''' is butyl
$n$ is 0, 1 or 2; Z is a single, double, or triple bond, and
$b$ is correspondingly 2, 1, or 0.

3. An odorant composition comprising a perfume mixture including an olfactible amount of 1-acetoxy-2-sec-butyl-2-ethynylcyclohexane.

4. An odorant composition comprising a perfume mixture including between 0.1 percent and 20 percent of 1-acetoxy-2-sec-butyl-1-ethynylcyclohexane.

* * * * *